June 20, 1967 F. LAW 3,326,281
FREEZING TANK

Filed May 24, 1965 3 Sheets-Sheet 3

INVENTOR:
Frank Law
By Alexander Dowell
ATTORNEYS

United States Patent Office 3,326,281
Patented June 20, 1967

3,326,281
FREEZING TANK
Frank Law, Blackpool, England, assignor to The
Tylde Water Board, Blackpool, England
Filed May 24, 1965, Ser. No. 457,931
Claims priority, application Great Britain, May 25, 1964,
21,495/64
7 Claims. (Cl. 165—169)

This invention relates to improvements to tanks in which sludges are treated by freezing and thawing to separate the solids from the liquid matter.

It has been proposed in the specification of British Patent No. 674,938 to treat sludges by freezing, thawing and filtering, including (if not already in the sludge) the addition of conditioning chemicals such as chlorine, ferrous sulphate of aluminium sulphate.

It is specifically suggested in the said specification that refrigeration coils be provided in sludge pans for refrigerating the sludge. However, while this may be suitable for small scale tests it is not efficient for large scale operation.

An object of the present invention is to provide an improvement in the freezing tank whereby the risk of damage due to repeated cycles of freezing and thawing is substantially reduced.

A further object of the present invention is to provide a tank in which rows of pipes for refrigerant are arranged in such a manner that they are easily accessible for repair.

According to the invention a freezing tank is provided which contains a series of removable units, each unit comprising an upper header and a lower header for refrigerating medium connected to a row of spaced pipes or to groups of two or more rows of spaced pipes, the units being arranged with the pipes extending from top to bottom of the tank with spaces between adjacent units, the rows being spaced angularly from each other fanwise, and the pipes of each row being spaced angularly from each other fanwise, the pipes being furthest apart at their upper ends.

The upper headers may each be joined by a coupling member to a common upper manifold and the lower headers may each have a connecting pipe which passes through a hole in the bottom of the tank to connect the lower headers to a common lower manifold, a further coupling member being provided between said connecting pipe and said lower manifold.

A constructional form of the invention will now be described by way of example, with reference to the accompanying drawings in which.

Figure 1:
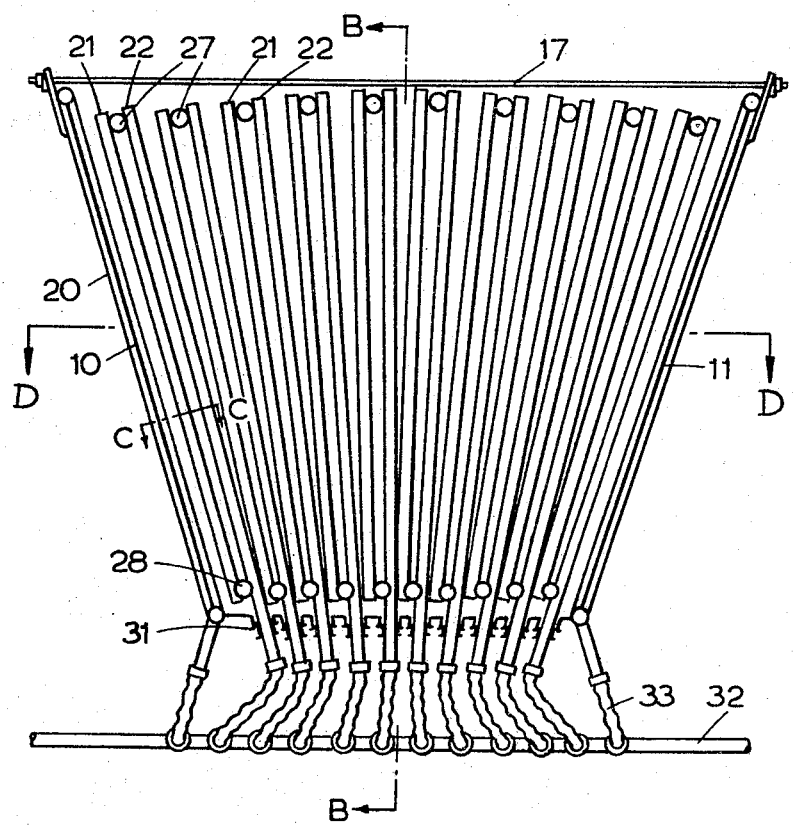
FIGURE 1 is a sectional view of the freezing tank taken on the line A—A of FIGURE 2.
Figure 2:
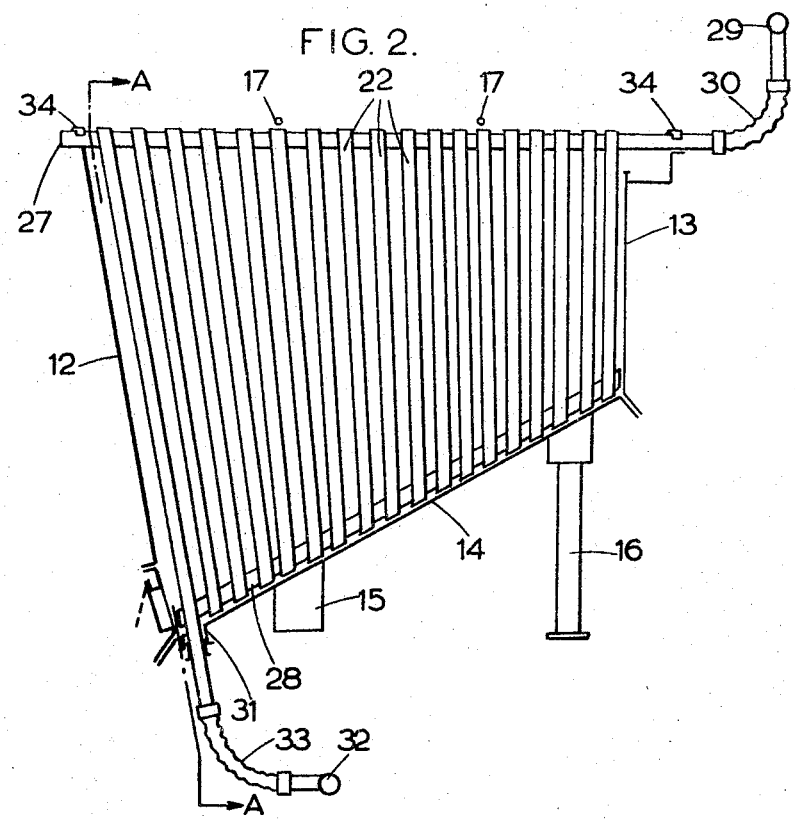
FIGURE 2 is a cross-sectional view through the tank taken along the line B—B in FIGURE 1 only the pipes of one side of a unit being shown for clarity.

The tank made of steel or other suitable material is provided which has a sloping rectangular bottom plate 14 the rear end of which is higher than the front end so that the depth at the front of the tank is double the depth at the rear. A front wall 12 of the tank is inclined with respect to a vertical rear wall 13 so that lower ends of the front and rear walls are nearer together than the upper ends. The distance between the upper edge of the front wall and the vertical rear wall is greater than the distance between the lower edge of the front wall and the vertical plane containing said rear wall by an amount equal to ⅜" to ¾" for every refrigerant pipe in a flow thereof extending from front to rear of the tank. Both front and rear walls are trapezoidal, the width at the bottom being the same whilst the width at the top of the front wall 12 is wider than the width at the top of the rear wall 13. The extra width of the front wall at the top is equal to about ½" for every unit. A unit comprises two rows of refrigerant pipes and will be described later. The front and rear edges of side walls 10, 11 join the side edges of the front and rear walls 12, 13. Tie bars 17 are provided across the side walls to prevent the latter from moving apart under the bursting pressure on freezing. The top edges of the four walls are in a common horizontal plane.

The tank is mounted on supports 15, 16 and contains pipes 20 extending from top to bottom of the tank in rows, with spaces between adjacent pipes.

The rows are arranged in pairs 21, 22 which extend from the front to the rear of the tank and which are spaced angularly from each other fanwise, i.e. the rows at the centre of the tank are substantially vertical whilst those adjacent the sides are substantially parallel to the latter. Furthermore, the pipes of each row are arranged fanwise, i.e. the lower ends of the pipes being nearer to each other than the top ends.

The sides of the tank are constructed with refrigerant pipes 20 and infill webs 25 welded to said pipes. In this construction the front and rear walls are flat plates although they could be constructed in a similar manner to the side walls.

Each pair of rows is connected at the top to one of a series of upper header pipes 27 and connected at the bottom to one of a series of lower header pipes 28. Each upper header pipe 27, is joined to a common upper manifold 29 by means of a coupling member 30, which expediently consists of a piece of flexible tubing, and each lower header pipe 28 has a connecting pipe 30 which is an extension of the end pipe of each unit which passes through a hole in the bottom of the tank sealed by a gland 31 and is coupled to a common lower manifold 32 by another coupling member 33 in the form of a piece of flexible tubing. Each pair of rows connected with an upper header and a lower header forms a unit which is easily removed from the tank when uncoupled from the upper and lower manifolds.

The upper ends of the units are located in relation to each other and to the tank by any suitable locating and clamping bars 34.

The refrigerant is introduced through the common upper manifold 29 into the upper header pipes 27 and thence flows through the pipes 21 and 22 and out through the lower header pipes 28 into the common lower manifold 32.

Figure 3:
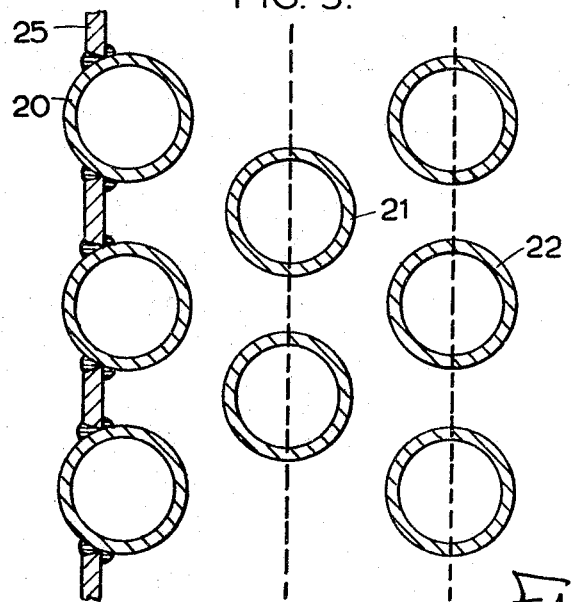
FIGURE 3 is a section on an enlarged scale taken along the line C—C of FIGURE 1 and shows a layout of the refrigerant tubes.

In order to reduce the time taken to freeze the sludge the spaces between the pipes should be as small as practicable and also as regular as possible. The best layout for pipes is to stagger them so that they are equidistant from each other in all directions, i.e. on a 60° grid (see FIGURE 3).

The distance D between adjacent pipes can conveniently be ¾" at the base of the tank and 1¼" at the top front of the tank where this is about 4 feet deep and 1" at the top rear where the depth is approximately 2 feet. Where the depth is otherwise then the increase in the dimension D from bottom to top can be proportionate.

By making the spaces between the pipes of tapering form with their larger ends uppermost, when the sludge liquor freezes the remaining sludge is squeezed upwards and extrudes at the top and thereby limits the expansion forces on the pipes and tank.

It is desirable that there shall not be any pockets of sludge to be frozen of width greater than $D_1$ and to ensure that this is so the side and back walls of the tank need to be refrigerated. This can be best arranged by welding strips of metal (not shown) between adjacent tubes in each pair of rows.

Figure 4:
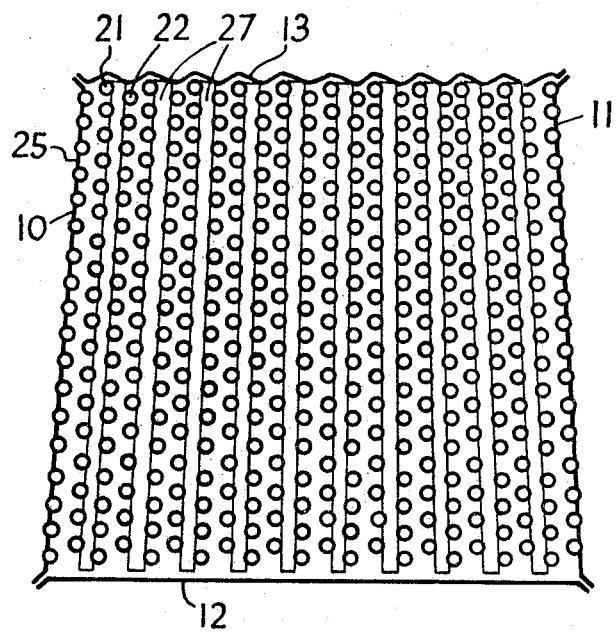
FIGURE 4 is a horizontal cross-sectional elevation taken along the line D—D of FIGURE 1.

It is desirable that the space defined by the walls of the tank and adjacent pipes or by each header and the bottom of the tank be as small as possible. This may be achieved by corrugating the walls (see FIGURE 4) (in the case where the walls do not contain refrigerant pipes) and/or bottom of the tank so that the pipes are disposed within the corrugations but are spaced from the wall. The corrugations add strength to the tank at the same time, enabling it to withstand the stresses of alternate freezing and thawing.

After freezing completely the tankful of sludge, valves are operated and hot refrigerant enters the tubes, is condensed on the walls of the tubes and runs down and out through the front pipes which pass through the bottom of the tank. At the same time the frozen sludge is thawed and the solids therein settle to the bottom. When the thawing is complete the tank is emptied by opening a door. The door at the bottom of the tank extends across the width of the tank and must be as narrow in vertical height as practicable so as not to form any pocket where sludge can be slow to freeze. If this happens the subsequent freezing may distort the door or the adjacent tubes. The inclination of the bottom ensures that the solids can be flushed out thoroughly.

In order to resist the expansive forces in the ice which may in due course produce distortion the pipes should preferably be about one and a quarter inch or one and a half inch internal diameter, and of substantial thickness.

There must be no interconnection between the pipes within the sludge portion above the level of the lower header—and such interconnection would get in the way of the expanding sludge.

At the top there must be space between the header pipes to enable the tank to be filled and for the freezing of the sludge to be observed.

These top header pipes must be well clear of the top of the sludge to be frozen.

Instead of the outlet pipe from the lower header pipe passing through the bottom of the tank, it may seat on a watertight seating over an outlet in the tank bottom. The lower header pipe may communicate through the tank bottom by any suitable means that permits lifting out of the unit and sealing of the contents of the tank against leakage.

I claim:
1. In a freezing tank, the provision of a series of removable units disposed within the tank in spaced relationship to each other and through which refrigerating medium is passed, each unit comprising an upper header arranged near the upper end of the tank, a lower header arranged near the bottom of the tank, and two rows of upwardly extending pipes connected at their upper and lower ends to the upper header and lower header respectively, the units being spaced angularly from each other fanwise, the units being furthest apart at their upper ends, and the upwardly extending pipes in each row being spaced angularly from each other fanwise, the upwardly extending pipes being furthest apart at their upper ends, a common upper manifold arranged above said tank to one side therof and in a substantially horizontal position, a plurality of coupling members connecting the upper headers to said common upper manifold, a common lower manifold arranged below said tank to one side thereof and in a substantially horizontal position, connecting pipes extending downwards from said units respectively through holes in the bottom of the tank, and further coupling members connecting the connecting pipes to said common lower manifold.

2. A frezing tank according to claim 1, wherein the connecting pipes which pass through the holes in the bottom of the tank are formed by extensions of the upwardly extending pipes at one end of the rows of spaced pipes, said freezing tank including sealing glands located in said holes for receiving said connecting pipes.

3. A freezing tank according to claim 1, wherein bars are provided across the tank to hold the units at their upper ends in their spaced apart positions.

4. A freezing tank according to claim 1, wherein the pipes are staggered so that they are equidistant from each other in all directions.

5. A freezing tank according to claim 1, wherein at least the rear wall of the tank is corrugated, said upwardly extending pipes at the rear end of the units being disposed within the corrugations but are spaced from the rear wall.

6. A freezing tank according to claim 1, including tie bars attached to the side walls of the tank at the upper end thereof to resist the bursting pressure due to freezing within the tank.

7. In a freezing tank, the provision of a series of removable units disposed within the tank in spaced relationship to each other and through which refrigerating medium is passed, each unit comprising an upper header arranged near the upper end of the tank, a lower header arranged near the bottom of the tank, and two rows of upwardly extending pipes connected at their upper and lower ends to the upper header and lower header respectively, the units being spaced angularly from each other fanwise, the units being furtherest apart at their upper ends, and the upwardly extending pipes in each row being spaced angularly from each other fanwise, the upwardly extending pipes being furthest apart at their upper ends, a common upper manifold arranged above said tank to one side thereof and in a substantially horizontal position, a plurality of coupling members connecting the upper headers to said common upper manifold, a common lower manifold arranged below said tank to one side thereof and in a substantially horizontal position a series of outlets in the bottom of the tank, seating elements providing watertight seatings arranged around said outlets respectively, and further coupling members connecting the outlets to said common lower manifold.

References Cited

UNITED STATES PATENTS

| | | | |
|---|---|---|---|
| 1,774,136 | 8/1930 | Forssblad | 165—175 X |
| 1,783,724 | 12/1930 | Lamont et al. | 165—175 X |
| 2,668,692 | 2/1954 | Hammell | 165—169 X |
| 2,796,822 | 6/1957 | Nikolajevic | 98—94 |
| 2,813,700 | 11/1957 | Schenck | 165—175 |

FOREIGN PATENTS

| | | |
|---|---|---|
| 910,544 | 5/1954 | Germany. |

ROBERT A. O'LEARY, *Primary Examiner.*

M. A. ANTONAKAS, *Assistant Examiner.*